3,555,896
STRESS DETECTOR AND LOCATOR FOR WELL PIPE

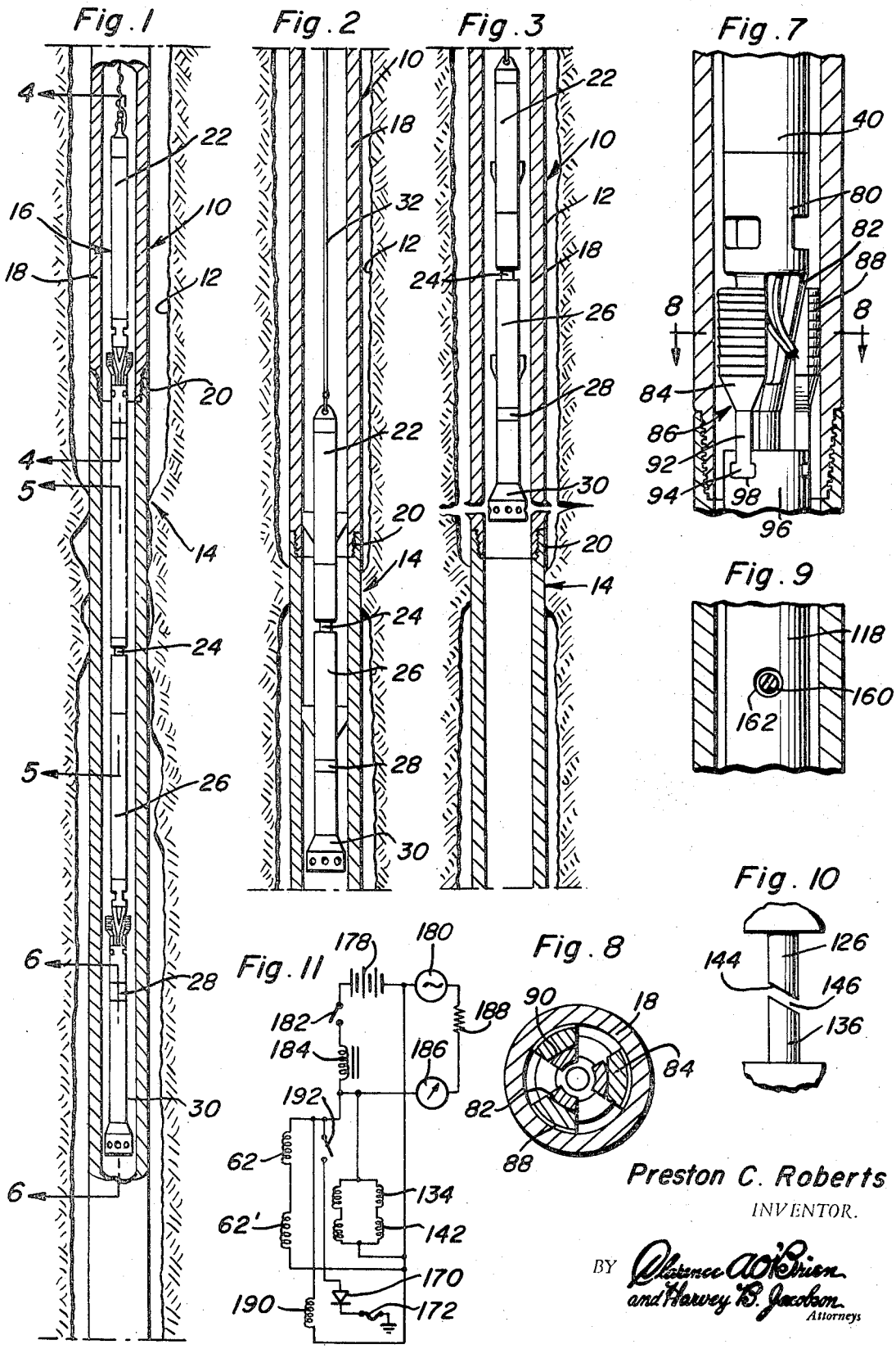

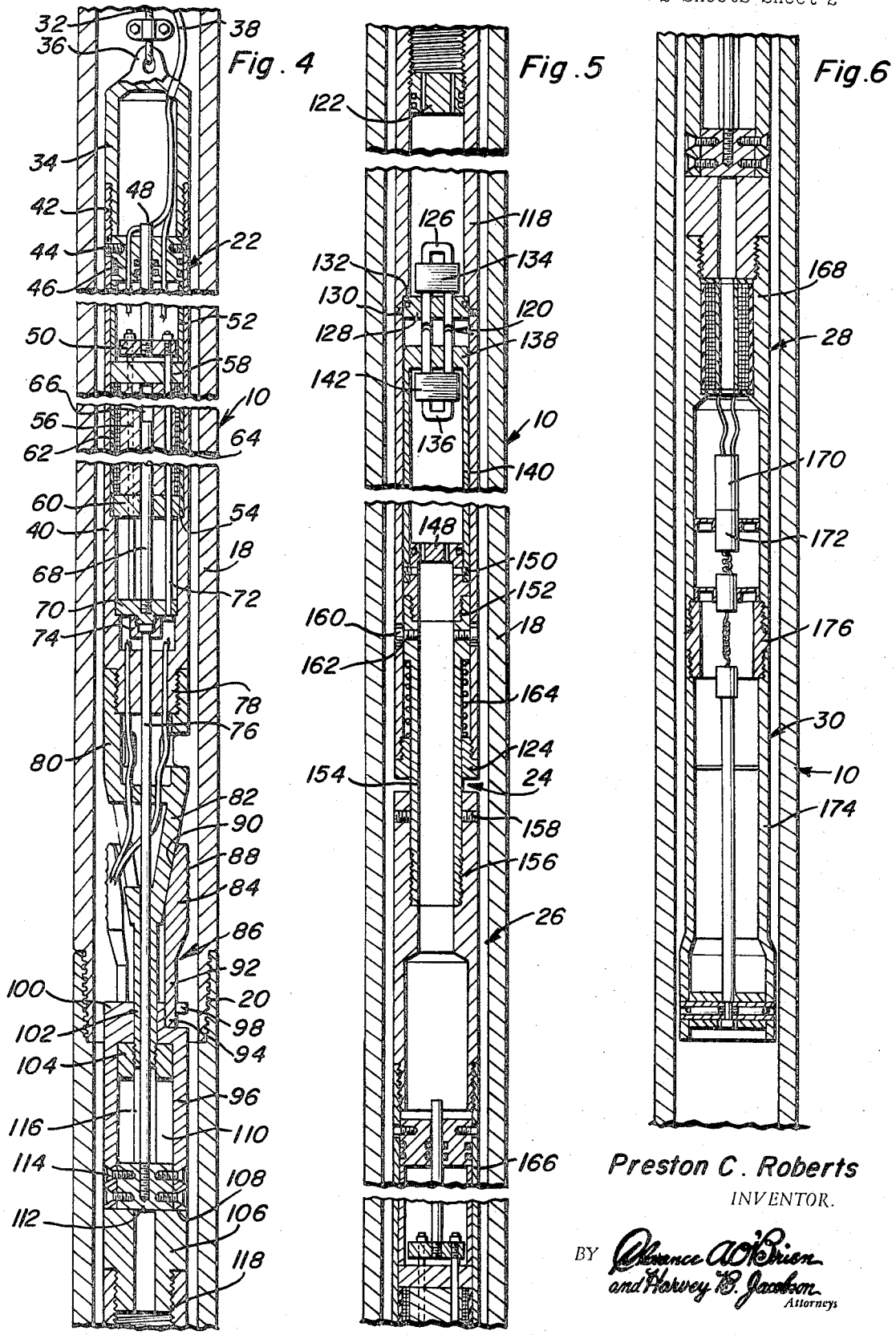

Preston C. Roberts, Bourg, La., assignor to Great Southern Oil Tool Co., Inc., a corporation
Filed Jan. 15, 1969, Ser. No. 791,240
Int. Cl. E21b *49/00*
U.S. Cl. 73—151                            18 Claims

ABSTRACT OF THE DISCLOSURE

The stuck point of a pipe string in a well bore is located by applying axial or torsional stress to the upper end of the pipe string and monitoring strain at different test depths within the bore hole. Strain is measured by an inductance unit sensing small displacements between a pair of anchoring assemblies mechanically anchored by one-way wedging devices to the pipe at each test depth, while the pipe string is under stress. The anchoring assemblies interconnected by the inductance unit, are suspended by a cable within the pipe string, the lowermost anchoring assembly carrying other tools for removal of pipe sections from the string at or above the stuck point.

---

This invention relates to the location of stuck points within a well bore and the removal of pipe sections at or above the stuck point.

The location of points at which a pipe string is stuck in a well bore, is presently determined by a basically well known method. This stuck point locating method involves the detection of differential strain within a pipe string at different test depths while the pipe string is subjected to an axial or torsional stress at its upper end. There will be a difference in strain of the pipe string above and below the stuck point, because the free portion of the pipe string above the stuck point will be deformed by a greater amount. Various types of devices have therefore been suspended by cable within the pipe string in order to measure localized strain at different test depths. Basically, such strain detecting devices are anchored at spaced points to the pipe string at some test depth so that a sensing unit may detect any relative movement between the spaced points when the pipe string is subjected to stress at its upper end. Relative displacement of the spaced anchor points has been detected by magnetic sensors or other electrical means. Anchoring of the sensor to the pipe at spaced points has been accomplished by magnetic attraction or mechanically by use of expansible bow springs. A commonly used electrical sensor for measuring strain involves the use of closely spaced electromagnetically magnetized pole pieces having magnetizing coils to which an A.C. current is supplied with metering means for detecting any change in the electrical characteristics of the A.C. current resulting from changes in the flux gap between the pole pieces.

It will be appreciated, that successful and efficient location of stuck points by use of electrical strain sensing devices as aforementioned, requires rapid and effective establishment of spaced anchor points between which strain is measured by the sensor in order to indicate the location of a stuck point when one of the anchor points is above the struck point and the other anchor point is below the stuck point. For effective and efficient use of the stuck point locating device, its anchor point establishing means must be adequate to not only support the weight of the sensing unit and the anchoring assemblies themselves but also any auxiliary equipment suspended therefrom, such as a joint locator and pipe cutter. In this manner, the free portion of the pipe string above the stuck point may be removed from the well bore immediately following location of the stuck point avoiding the necessity of retrieving the stuck point locator and reinserting a separate pipe removal assembly. Although the anchoring mechanism utilized to establish the spaced anchor points must be sufficient to support the increased load, it must still meet the close dimensional requirements of the pipe string and must be easily disengaged from the pipe so that the sensing unit may be moved from one test depth to another without delay. It will be apparent however, that these objectives are not always met by anchoring mechanisms of the magnetic or mechanical type. For example, anchoring of the sensor by magnetic attraction is often unreliable because of dielectric deposits formed on the internal surface of the pipe string. Also, such magnetic anchoring mechanisms are unsuitable when torsional stress is applied. Physical establishment of anchor points by expansible bow spring devices on the other hand very often do not establish sufficient holding force to support a tool string suspended below the sensing unit.

An important object of the present invention therefore is to provide apparatus which will not only effectively and efficiently locate the stuck point in a well bore but also facilitate removal of the free portion of the pipe string above the stuck point after it is located.

In accordance with the present invention, an inductance type of strain sensing unit is yieldably positioned by a lost motion connector between a pair of anchoring assemblies adapted to be anchored to the pipe string at spaced locations by one-way wedging devices. Once the anchoring points are established by the anchoring assemblies, the apparatus is held in position within the pipe string by its own weight and the weight of any tool string suspended therefrom so that the suspension cable through which the apparatus is lowered into the pipe string, may be slackened. An A.C. current may then be applied to the coils associated with the sensing unit and the current monitored by a meter for changes in its characteristics when an axial or torsional force is applied to the pipe string at its upper end. After the strain sensing operation is completed, the apparatus suspension cable may be tensioned to exert an upward pull on the apparatus thereby releasing the wedging devices so that the apparatus may be moved to a new testing depth. The released wedging devices associated with the anchoring assemblies may be displaced into gripping engagement in one embodiment of the invention by solenoid operated actuators that upwardly displace a slide member to which the wedging elements are connected, the wedging elements being held in contact with a downwardly converging conical cage member which cams the wedging elements radially outwardly into gripping engagement with the pipe. The solenoid actuators are energized by a D.C. current which may be removed once frictional contact is established between the wedging elements and the pipe.

Auxiliary tools such as a pipe joint locator and pipe cutter, are suspended from the lowermost anchoring assembly. These tools add to the weight of the apparatus so as to more firmly establish the anchoring points. Also, they enable the operator to immediately remove the free pipe section above the stuck point once it is located, by upwardly displacing the apparatus to a position above the stuck point and locating the closest pipe joint above the stuck point. The pipe may then be cut above this pipe joint by a pipe cutter or unscrewed at the pipe joint by utilizing an appropriate torque applying tool.

These together with other objects and advantages which wil become subsequently apparent reside in the details of construction and operation as more fully hereinafter described and claimed, reference being had to the accompanying drawings forming a part hereof, wherein like numerals refer to like parts throughout, and in which:

FIG. 1 is a vertical section through a well bore, pipe string installation within which the apparatus of the present invention is shown in use.

FIG. 2 is a vertical section view showing the apparatus of the present invention in another stage of operation.

FIG. 3 is a vertical section view showing the apparatus in a final stage of operation.

FIG. 4 is an enlarged partial sectional view taken substantially through a plane indicated by section line 4—4 in FIG. 1.

FIG. 5 is an enlarged partial sectional view taken substantially through a plane indictaed by section line 5—5 in FIG. 1.

FIG. 6 is an enlarged partial sectional view taken substantially through a plane indicated by section line 6—6 in FIG. 1.

FIG. 7 is a side elevational view of the wedging device of an anchoring assembly within a longitudinal section of a pipe string as shown in FIG. 2.

FIG. 8 is a transverse sectional view taken substantially through a plane indicated by section line 8—8 in FIG. 7.

FIG. 9 is a side elevational view of a portion of the apparatus within a vertical section of the pipe string.

FIG. 10 is an enlarged partial side elevational view of a portion of the strain sensing unit associated with the apparatus of the present invention.

FIG. 11 is a simplified electrical circuit diagram showing the electrical control system associated with the apparatus.

Referring now to the drawings in detail, FIG. 1 illustrates a typical pipe string generally denoted by reference numeral 10 extending vertically through a borehole 12. As often occurs, the pipe string becomes wedged or stuck within the bore hole at one or more locations 14 as shown in FIG. 1. Apparatus in accordance with the present invention generally referred to by reference numeral 16 is therefore lowered into the pipe string and held at different depths therewithin in order to locate the stuck point 14 and then remove the free portion of the pipe string above the stuck point such as the pipe section 18 secured by the pipe joint 20 to the pipe sections below the stuck point.

The apparatus 16 includes an upper anchor assembly 22 interconnected by a lost motion connecting assembly 24 to a lower anchor assembly 26 from which auxiliary tools may be suspended such as the joint locator tool 28 and a jet type pipe cutter tool 30. The apparatus is lowered to different test depths by a suspension cable 32 and anchored at spaced locations to the pipe string by means of the anchor assemblies 22 and 26 at each test depth as shown in FIG. 2. The anchor points for the anchor assemblies illustrated in FIG. 2, are shown to be respectively above and below the stuck point 14. Accordingly, when axial or torsional stress is applied to the pipe string, the free portion of the pipe string above the stuck point will be deformed relative to the stuck portion of the pipe string below the stuck point causing a corresponding displacement between the anchor assemblies 22 and 26 since the anchor assemblies are respectively anchored to the pipe string above and below the stuck point. If the entire apparatus were disposed at test depths either above or below the stuck point, no relative displacement would occur between the anchor assemblies when anchored to the pipe string. Therefore, only at a stuck point depth of the apparatus, will there be any relative displacement between the anchor assemblies. By sensing such relative displacement between the anchor assemblies when the pipe string is stressed, the stuck point location may be determined from the depth of the apparatus as measured through the suspension cable 32.

Once the stuck point location is determined, the apparatus may be raised to a position from that illustrated in FIG. 2 to one in which the joint locator 28 is aligned with the joint 20 immediately above the stuck point. The apparatus may then be raised immediately above the located pipe joint 20 to a position as illustrated in FIG. 3 so that the pipe may be cut and then be removed. Alternatively, the pipe cutter may be replaced by a torque applying tool for unthreading the pipe joint 20 in order to remove the pipe sections above the stuck point. Pipe joint locators, pipe cutters and pipe joint threading tools for use in connection with the present invention, are well known and per se form no part of the present invention.

Referring now to FIG. 4 in particular, it will be observed that the upper anchor assembly 22 has a tubular cap 34 provided with an eye formation 36 to which the cable 32 is attached. An electrical conduit 38 also extends into the cap 34 for supplying electrical energy to the apparatus as well as to transmit strain sensing signals. The cap is of a diameter equal to the outside diameter of an elongated tubular housing section 40, the upper end of which is threadedly connected to the cap at 42. Secured within the upper portion of the housing section by setscrews 44, is a sealing plug 46 through which electrical conductors extend from the conduit 38. The sealing plug also is provided with a central sealing bore through which a guide rod 48 extends upwardly from a collar member 50 associated with a solenoid actuator. The collar 50 is axially movable within a tubular spacer 52 that axially spaces the plug 46 from a solenoid assembly positioned axially between the spacer 52 and an internal shoulder 54 formed within the housing section 40. The solenoid assembly includes a coil form 56 disposed between the axially fixed end collars 58 and 60 so as to mount a solenoid coil 62 within the outer, dielectric sheathing 64. Slidably mounted within the bore 66 of the coil form, is the core 68 of an armature assembly which includes the guide rod 48, the collar 50 to which it is connected and the lower collar 70 connected to the lower end of the core 68 and to the upper collar 50 by tie rods 72 slidably extending through the solenoid coil form 56 and end collars 60 and 58. A fitting 74 connects the lower end of the armature assembly to an elongated actuating plunger 76 that extends downwardly from the housing section 40 through a lower, externally threaded connecting portion 78 of the housing section.

The housing section 40 is connected at its lower end 78 to the upper end of a cage member 80 having an outer diameter equal to that of the housing section 40. Extending downwardly from the upper portion of the cage member 80, is a downwardly converging conical portion 82 having external surfaces in contact with a plurality of rigid wedging elements 84 forming part of a one-way wedging device generally referred to by reference numeral 86. Referring to FIG. 4 as well as FIGS. 7 and 8, it will be observed that in the illustrated embodiment, three wedging elements are provided each of which is provided with an external arcuate gripping surface 88 adapted to be displaced into frictional contact with the internal surfaces of the pipe section 18 by upward displacement since the internal camming surfaces 90 of the wedging elements are held in engagement with the downwardly converging conical portion 82 of the cage 80. The surfaces 88 when engaged are in coaxial relation to the pipe. Each of the wedging elements is provided with a leg portion 92 having an enlarged lower end 94 through which the wedging element is connected to the upper end of a tubular slide member 96 having T-slots 98 within which the ends 94 of the wedging elements are received. The tubular slide member 96 includes an upper portion 100 within which the connecting slots 98 are formed and through which an elongated tubular section 102 extends from the conical portion 82 of the cage. Threadedly connected to the lower end of the tubular section 102, is a diametrically larger guide member 104 as shown in FIG. 4 adapted to abut the upper portion 100 of the slide member in order to limit downward movement thereof to the position shown in FIG. 4. Thus, the tubular slide member 96 below its upper portion 100 surrounds the guide member 104 which has a diametrically larger lower connecting portion 106 forming a shoulder 108 engaged by the lower end of the tubular slide member 96 in its lower limit position as shown. The guide member is also provided with guide slots 110 within its diametrically smaller portion for slidably receiving a connector block 112 secured by fasteners 114 to the lower end of the tubular slide member 96. Also, the connector block 112 is threadedly connected to the lower end of the actuating plunger 76 that extends through the cage member 80 and the bore 116 within the guide member. It will therefore be apparent, that upon energization of the solenoid coil 62, the armature assembly will upwardly displace the actuating plunger 76 together with the slide member 96 resulting in the upward displacement of the wedging elements 84 and their radially outward displacement into gripping engagement with the pipe section. Once the wedging elements are engaged with the pipe, and the tension in the suspending cable 32 relieved, the anchor assembly and all of the other components of the apparatus suspended therefrom will exert a downward gravitational force on the conical cage portion 82 thereby increasing the radial camming force component exerted on the wedging elements 84 to maintain the wedging elements in firm gripping engagement with the pipe. The anchor assembly therefore remains anchored to the pipe upon removal of a D.C. energizing current to the solenoid coil 62 by means of which the wedging elements were initially engaged.

The lower connecting portion 106 of the guide member which is fixed to the upper housing section 40, is threadedly connected to a lower housing section 118 having an outer diameter equal to that of the upper housing section 40 and within which a portion of the strain sensing unit 120 is mounted as shown in FIG. 5. A sealing plug 122 is threadedly secured within the lower housing section 118 adjacent its upper threaded end in order to protectively enclose the sensing unit 120 disposed therebelow. The lower end of the housing section 118 is closed by a threadedly mounted slide bushing member 124 which slidably receives the lost motion connecting assembly 24 by means of which the upper anchor assembly 22 is connected to the lower anchor assembly 26. Therefore, the sensing assembly 120 is also mounted within the lost motion connecting assembly 24 so that any relative movement between the two anchor assemblies resulting from differential strain of the pipe string above and below a stuck point, may be detected.

The sensing assembly 120 includes an upper horseshoe shaped core 126 as shown in FIG. 5 which is fixedly mounted by a sealing plug 128 fastened within the housing section 118 by setscrews 130 in abutment with internal shoulder 132. A magnetizing coil assembly 134 is mounted on the core 126 to which the D.C. energizing current is supplied by conductors extending through the sealing plug 122. A second horseshoe shaped core 136 is mounted by the upper end portion 138 of a tubular member 140 movably mounted within the housing section 118 in spaced relation to the fixedly mounted sealing plug 128. A second magnetizing coil assembly 142 is mounted on the core 136 for magnetization thereof. As more clearly seen in FIG. 10, the electromagnetically magnetized cores 126 and 136 have closely spaced, paralled pole faces 144 disposed at an angle to the longitudinal axis of the apparatus housing sections or the axis of the pipe string. Thus, a flux gap 146 is formed between the pole faces which is varied in spacing as a result of any differential axial or torsional strain causing relative axial or angular displacement between the anchor assemblies.

The core 136 associated with the sensing unit 120 is protectively enclosed within the tubular member 140 by the lower sealing connector 148 secured by fasteners 150 to the lower end of the tubular member 140. The connector 148 is threadedly connected to an upper threaded end portion 152 of a relatively slender connector tube 154 associated with the lost motion connecting assembly 24. The lower end of the connector tube 154 is threadedly connected to the upper housing portion 156 of the lower anchor assembly 26, setscrew fasteners 158 also being provided for preventing any axial displacement between the connector tube and the housing section 156. Limited relative displacement between the connector tube 154 and the lower housing section 118 of the upper anchor assembly is accommodated and toward this end, a pair of cap screws 160 are sesured to the upper portion 152 of the connector tube with the head portions thereof projecting radially into openings 162 formed in the housing section 118 as shown in both FIGS. 5 and 9. A certain amount of radial clearance is provided between the cap screw head portions 160 and the openings 162 for limited relative displacement both axially and angularly in all directions when the connecting assembly 24 and the lower portion of the sensing unit 120 are in a relative neutral position. Thus, the connecting assembly 24 is biased to or yieldably suspended in its neutral position from the upper anchor assembly by means of a coil spring 164 disposed about the connector tube 154 axially abutting the slide bushing 124 and the shoulder formed by the upper portion 152 of the connector tube as shown in FIG. 5.

The upper housing section 156 of the lower anchor assembly 26 is connected to a lower housing section 166 which encloses a wedging device similar in structure and operation to the wedging device hereinbefore described in connection with the upper anchor assembly in order to simultaneously anchor the lower anchor assembly to the pipe string. The lower end of the lower anchor assembly is threadedly connected to the housing section 168 enclosing the pipe joint locator 28 as shown in FIG. 6 together with the current rectifying diode 170 connected in series with a fuse device 172 for igniting the explosive associated with the jet pipe cutter enclosed by the casing 174 to which the housing section 168 is connected by the connector fitting 176. As hereinbefore indicated, any commercially available pipe joint locator and pipe cutter may be utilized as well as other tools.

Referring now to FIG. 11, it will be observed that a source of D.C. current 178 and a source of A.C. current 180 are provided in order to furnish electrical energy respectively to the solenoid actuators for the anchor assemblies and the magnetizing coils 134 and 142 of the sensing unit. Thus, upon closing of the anchor activating switch 182, D.C. current is supplied through the A.C. choke coil 184 to the series connected solenoid windings 62 and 62' respectively associated with the upper and lower anchor assemblies in order to establish the spaced anchor points by means of the one-way wedging devices hereinbefore described. Upon opening of the switch 182 after the wedging devices are engaged, the A.C. current from the source 180 conducted through the magnetizing coils 134 and 142 of the sensing unit in series with the meter 186 and load resistor 188 may be monitored for any changes in current characteristics.

Thus, it will be apparent that the apparatus may be anchored at different testing depths and any differential strain detected at each depth in order to determine the location of the stuck point. Once the stuck point is located, the apparatus may be upwardly displaced until the sensing coil 190 associated with the joint locator indicates the presence of a pipe joint. After the pipe joint is located, the pipe cutter may be triggered into operation by closing of the switches 182 and 192 to supply D.C. energizing current to the fuse 172 through diode 170 and thereby energize the auxiliary tool 30 suspended from the lower anchor assembly.

The foregoing is considered as illustrative only of the principles of the invention. Further, since numerous modifications and changes will readily occur to those skilled in the art, it is not desired to limit the invention

What is claimed as new is as follows:

1. In an apparatus for locating a point at which pipe is stuck in a well bore, a pair of axially spaced anchoring assemblies, lost motion connecting means interconnecting said assemblies, cable means for suspending said interconnected assemblies within the pipe, sensing means interconnected between the lost motion connecting means and one of the anchoring assemblies for establishing signals in response to relative displacement between the pair of assemblies, each of said anchoring assemblies including one way wedging means urged into gripping engagement with the pipe by the weight of the interconnected assemblies, means mounting the wedging means for disengagement from the pipe in response to tensioning of the cable means, and actuating means rendered operative to displace said wedging means into frictional contact with the pipe for effecting said gripping engagement.

2. The combination of claim 1 including a source of D.C. and A.C. current, means for supplying D.C. current from said source to the actuating means for rendering the same operative, and monitoring means connected to said source for detecting establishment of said signals by the sensing means upon removal of D.C. current from the actuating means.

3. The combination of claim 2 including auxiliary tool means suspended from the interconnected anchoring assemblies.

4. The combination of claim 3 wherein said tool means includes a joint locator and a pipe cutter.

5. The combination of claim 4, wherein said wedging means includes a plurality of rigid elements having externally arcuate friction engaging surfaces arranged substantially coaxial to the pipe.

6. The combination of claim 5 wherein said mounting means comprises a downward converging conical member with which the wedging means is in slidable contact, guide means extending downwardly from the conical member and a slide member movably mounted on the guide means and interconnected with the wedging means to hold the same in sliding contact with the conical member.

7. The combination of claim 6 wherein the actuating means includes an axially displaceable plunger connected to the slide member and extending through the guide means and the conical member, an armature connected to the plunger above the conical member and a solenoid winding mounted about the armature to which the current supplying means is connected.

8. The combination of claim 7 wherein said lost motion connecting means includes a tubular connector having opposite end portions connected to one of the anchoring assemblies and the sensing means respectively, spring means mounted by the other of the anchoring assemblies biasing the tubular connector to a neutral position, said other of the anchoring assemblies having a tubular portion receiving the connector and provided with at least one opening therein, and limit means projecting radially from the connector into the opening.

9. The combination of claim 1 including auxiliary tool means suspended from the interconnected anchoring assemblies.

10. The combination of claim 9 wherein said tool means inculdes a joint locator and a pipe cutter.

11. The combination of claim 1, wherein said wedging means includes a plurality of rigid elements having externally arcuate friction engaging surfaces arranged substantially coaxial to the pipe.

12. The combination of claim 11 wherein said mounting means comprises a downward converging conical member with which the wedging means is in slidable contact, guide means extending downwardly from the conical member and a slide member movably mounted on the guide means and interconnected with the wedging means to hold the same in sliding contact with the conical member.

13. The combination of claim 12 wherein said lost motion connecting means includes a tubular connector having opposite end portions connected to one of the anchoring assemblies and the sensing means respectively, spring means mounted by the other of the anchoring assemblies biasing the tubular connector to a neutral position, said other of the anchoring assemblies having a tubular portion receiving the connector and provided with at least one opening therein, and limit means projecting radially from the connector into the opening.

14. The combination of claim 1 wherein said mounting means comprises a downward converging conical member with which the wedging means is in slidable contact, guide means extending downwardly from the conical member and a slide member movably mounted on the guide means and interconnected with the wedging means to hold the same in sliding contact with the conical member.

15. The combination of claim 14 wherein said lost motion connecting means includes a tubular connector having opposite end portions connected to one of the anchoring assemblies and the sensing means respectively, spring means mounted by the other of the anchoring assemblies biasing the tubular connector to a neutral position, said other of the anchoring assemblies having a tubular portion receiving the connector and provided with at least one opening therein, and limit means projecting radially from the connector into the opening.

16. The combination of claim 2 wherein the actuating means includes an axially displaceable plunger connected to the slide member and extending through the guide means and the conical member, an armature connected to the plunger above the conical member and a solenoid winding mounted about the armature to which the current supplying means is connected.

17. The combination of claim 16 wherein said lost motion connecting means includes a tubular connector having opposite end portions connected to one of the anchoring assemblies and the sensing means respectively, spring means mounted by the other of the anchoring assemblies biasing the tubular connector to a neutral position, said other of the anchoring assemblies having a tubular portion receiving the connector and provided with at least one opening therein, and limit means projecting radially from the connector into the opening.

18. The combination of claim 1 wherein said lost motion connecting means includes a tubular connector having opposite end portions connected to one of the anchoring assemblies and the sensing means respectively, spring means mounted by the other of the anchoring assemblies biasing the tubular connector to a neutral position, said other of the anchoring assemblies having a tubular portion receiving the connector and provided with at least one opening therein, and limit means projecting radially from the connector into the opening.

References Cited

UNITED STATES PATENTS

| | | | |
|---|---|---|---|
| 2,277,110 | 3/1942 | Johnson | 73—151X |
| 2,530,309 | 11/1950 | Martin | 73—151 |

JERRY W. MYRACLE, Primary Examiner